(No Model.)
C. M. SCHWARZ.
CLARIFYING AND EVAPORATING PAN.
No. 333,166. Patented Dec. 29, 1885.
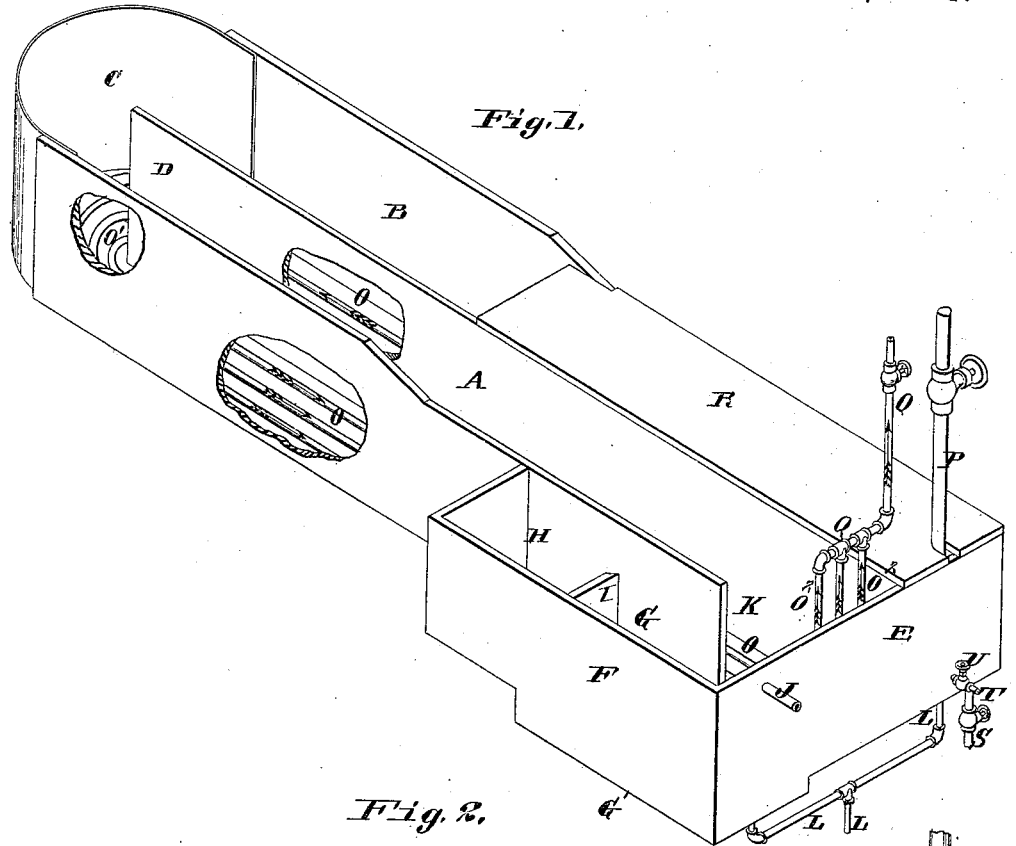
Fig. 1.
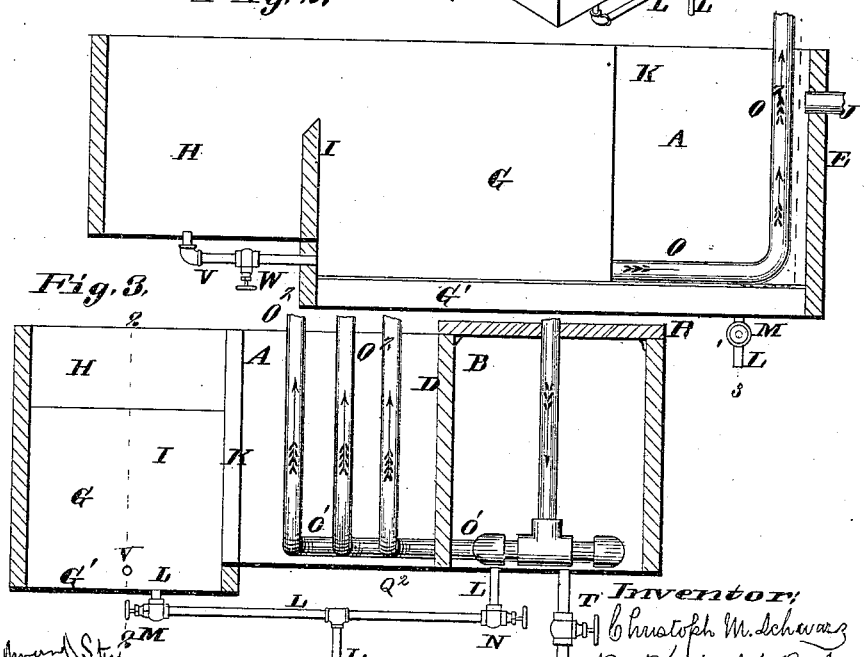
Fig. 2.
Fig. 3.
Attest:
Edward Stein
L. M. Hopkins
Inventor:
Christoph M. Schwarz
By Knight Bro's
Attys.

UNITED STATES PATENT OFFICE.

CHRISTOPH M. SCHWARZ, OF EDWARDSVILLE, ILLINOIS.

CLARIFYING AND EVAPORATING PAN.

SPECIFICATION forming part of Letters Patent No. 333,166, dated December 29, 1885.

Application filed May 9, 1885. Serial No. 161,908. (No model.)

*To all whom it may concern:*

Be it known that I, CHRISTOPH M. SCHWARZ, of Edwardsville, Madison county, Illinois, have invented a certain new and useful Improvement in Clarifying and Evaporating Pans, of which the following is a full, clear, and exact description, reference being had to the accompanying drawings, forming part of this specification.

My invention consists in certain features of novelty, which are particularly pointed out in the claims.

Figure 1 is a perspective view of the pan with parts broken out. Fig. 2 is a vertical longitudinal section at 2 2, Fig. 3. Fig. 3 is a transverse vertical section at 3 3, Fig. 2.

The pan has two parallel portions, A and B, communicating together by a passage, C, at one end, where the partition D falls short of the end of the pan. The partition D is secured to the end E, so as to prevent the passage of liquid between the portions A and B at that point.

F is a side extension containing the receiving-trough G and the scum-trough H, between which is the partition I, over which the scum flows as it is formed by the heating of the liquid.

The cane-juice, sap, or other liquid first enters the trough G through a pipe, J, (or by other means,) and as the liquid is evaporated in the pan A B its place is taken by liquid flowing from the receiving-trough G through the passage K. The bottom G' of the receiving trough or pocket G is at a lower level than the bottom of the rest of the pan, thus forming a receptacle for the settlings.

L is a drain-pipe whose ends are turned upward and pass, respectively, through the bottoms of the parts B and G. The contents of the pan may be discharged through the pipe L. The discharging-pipe L has valves or cocks M and N to close communication between said pipe and the parts G and B, respectively.

The contents of the pan is heated by steam-pipes O, extending in parallel lines from the front end of the portion B to the rear end of the same, where they are curved in the part C in return-bends O', from which they extend to the front end of the portion A, where they are bent upward at $O^2$, and connected with the steam-exhaust pipe Q. The steam from the boiler is received through a pipe, P, and enters a cross-pipe, P', to which the ends of the pipes O are connected. The pipes P and Q are supplied, respectively, with valves P' and Q'.

The front half (more or less) of the portion B has a cover, R, which should be made removable to allow access to be had to the front part of B for the purpose of cleaning, &c. The purpose of the cover R is to confine the steam arising from the sirup and force it to move backward in escaping from beneath the cover. This backward movement of the steam carries the scum backward, and establishes an upper current in the liquid in the pan, that sweeps the scum toward the pocket G, from which it is carried into the scum box or receptacle H.

When the juice has attained the required density—say 18° to 20° Baumé—it is discharged through a pipe, S, having a suitable valve or cock, T. This valve is so adjusted that a regular discharge is kept up, and as soon as the discharge has been properly regulated very little attention is required. The steam-inlet valve P' is usually kept wide open, and the boiling regulated by the valve Q'. It will be understood that the juice increases in both temperature and density from the place of reception at J to the point of discharge at S.

U is a cock for testing the sirup as to density.

V is a pipe leading from the bottom of the scum box or trough H to the pocket G, the pipe having a valve, W. By the pipe V the liquid within the scum-box is carried into the pocket G, leaving the scum behind.

I am aware that it has been proposed to place a grate beneath one end of an evaporating-pan with a flue or hot-air chamber extending to the chimney or smoke-stack at the other in such a manner that the heat passes beneath the pan from end to end, being of course most intense just over the grate, the pan being divided by a central partition into two compartments connected at the end over the grate by a pipe or passage. The sirup is admitted to one and drawn off from the other of these compartments at the end of the pan remote from the passage which connects them, so that it traverses the two compartments in opposite directions. This is not the equivalent of my arrangement of heating-pipes.

I claim—

1. The combination, with an evaporating-pan, of the heating-pipes entering said pan at the discharge end, a cover placed over said discharge end, and a scum-overflow at the receiving end, substantially as set forth.

2. The combination, with the receptacle having its receiving and discharge ends side by side, as described, of the heating-pipes entering said receptacle at one end, and a covering for said end for directing the steam rising from the sirup rearward or away from the operator's stand, as set forth.

3. The combination, with an evaporating-pan, of a scum box or trough having its floor in a plane above that of the pan, and a pipe leading from the floor of said scum-box into the pan, as and for the purposes set forth.

4. In an evaporating-pan, the combination, with a receptacle through which the sirup flows, of the heating-pipes extending through said receptacle, and the heating medium passed through said pipes in a direction opposite to the flow of the sirup, as set forth.

5. The combination, with the evaporating-receptacle A B C, of the receiving-trough G, separate therefrom and communicating therewith through the passage K, and the scum-box H, separated from the trough G by an overflow-partition, I, substantially as set forth.

6. The combination, with the compartments G and H, of the connecting-pipe V, leading from one to the other, substantially as and for the purpose set forth.

7. The combination, in an evaporating-pan, of the portions A and B, communicating at one end and containing heating-pipes and discharge-pipe, as S, at the end of the pan in which are the ends of the heating-pipes into which the steam first enters, substantially as set forth.

8. The combination, with an evaporating-pan, of a branched pipe communicating, respectively, with the receiving and discharge ends of the apparatus, and a cock in each branch of said pipe, as and for the purpose set forth.

CHRISTOPH M. SCHWARZ.

Witnesses:
S. O. BONNER,
P. KREMER.